(No Model.)
M. F. BROWN.
COMBINED FLOUR BIN AND SIFTER.
No. 498,232. Patented May 30, 1893.
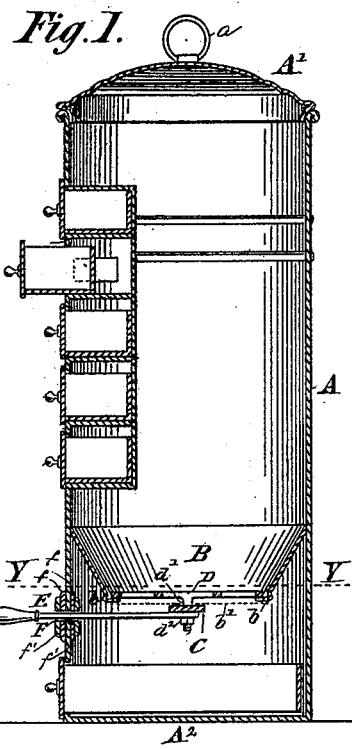
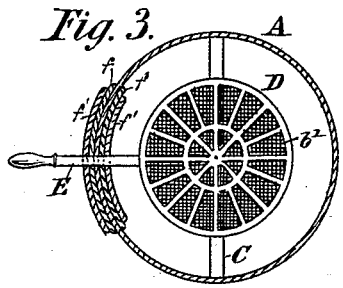
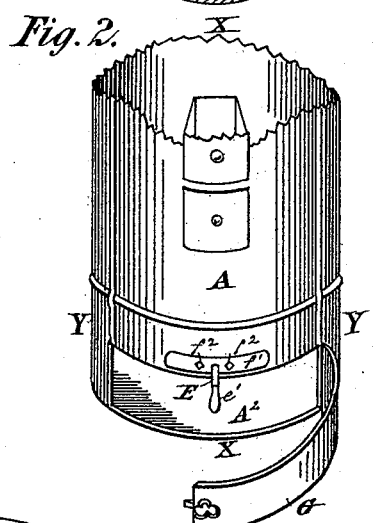
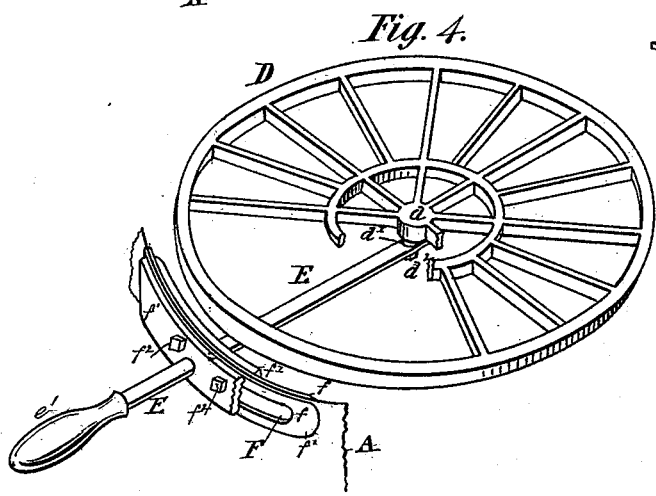
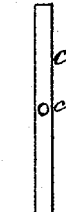
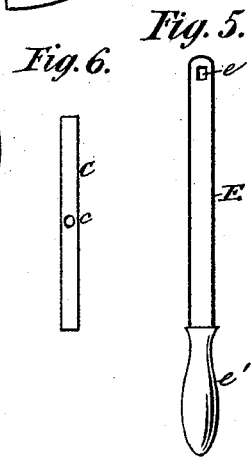
Witnesses
Frank Pardon
Henry C. Secrist
Millard F Brown Inventor
By his Attorney
R. M. Kelly

UNITED STATES PATENT OFFICE.

MILLARD F. BROWN, OF LOUISVILLE, KENTUCKY.

COMBINED FLOUR BIN AND SIFTER.

SPECIFICATION forming part of Letters Patent No. 498,232, dated May 30, 1893.

Application filed February 19, 1892. Serial No. 422,069. (No model.)

*To all whom it may concern:*

Be it known that I, MILLARD F. BROWN, of Louisville, in the county of Jefferson, in the State of Kentucky, have invented certain new and useful Improvements in a Combined Flour Bin and Sifter, of which the following, taken in connection with the accompanying drawings, is a full, clear, and exact description.

This invention has relation to receptacles for flour, meal, &c., in which the flour or meal may be kept and from which it may be removed, in such quantities as desired, without subjecting the entire mass to handling or exposure to the outer atmosphere, and be readily sifted during the process of removal, and its objects are, first, to provide such devices with novel and advantageous means for agitating the flour or meal to separate the impurities therefrom previous to use, and second, to increase the durability of the casing at the points where the handle and slides operate.

To these ends the invention consists in certain peculiarities in the construction, arrangement and combination of the several parts, substantially as hereinafter described and particularly pointed out in the subjoined claims.

In the drawings Figure 1 is a longitudinal sectional view of my combined flour-bin and sifter on the line X X in Fig. 2 showing the casing thereof provided with spice drawers, which latter, however, form no part of my present invention. Fig. 2 is a perspective front view of same with the upper part broken away. Fig. 3 is a horizontal section of the same line Y, Y, of Fig. 2. Fig. 4 is a detached perspective view of the stirrer and its attachments with parts broken away to show the fastening of the handle to the stirrer and the handle slot. Fig. 5 is a detail view of the handle and Fig. 6 a detail view of the cross bar.

A designates the casing of the bin, which is preferably of elongated cylindrical form and intended to stand vertically upon its lower end or base. The top of the bin is closed by a removable cover A' having a downwardly extending flange near its outer edge adapted to fit closely within casing A. This cover is provided with a ring or other suitable handle, *a*. The lower end of the casing is closed by a fixed bottom A². In the lower part of said casing, at a suitable distance above its bottom, a stationary deflector B, in the shape of an inverted frustum of a hollow cone, with its larger base of the same diameter as the internal diameter of the casing, is attached to the casing internally by soldering, or otherwise, along the edges at the larger base, its interior walls depending inwardly and downwardly toward the bottom of the bin. Around the edges of the lower and smaller base of the deflector, is constructed an inwardly projecting flange *b*, to which is secured a mesh or sieve *b'* extending horizontally across the said base. Under the sieve *b'* is located a stationary cross bar C, the ends of which are secured to the casing.

Above the sieve *b'* is placed a stirrer D, consisting of a circular rim, which rests on the flange *b*, radial arms or spokes centering in a hub *d* from which projects downwardly an axle post *d'*, integral with the hub, rectangular in perimeter next to the hub but rounded and threaded at its lower end to receive a screw tap *d²*. This axle post projects downward through an aperture *c* in the cross bar C which cross bar helps to support the sieve and furnishes a bearing for said axle post. This stirrer with its axle post is preferably cast in one piece. The stirrer is actuated by a handle bar E which is a flat bar having at one end a rectangular aperture *e* adapted to fit on the rectangular portion of the axle post of the stirrer, and at the other end a handle *e'*. This handle bar extends horizontally through a slot F in the casing directly to the axle post and its rectangular aperture *e* engages the rectangular portion of said axle post and it is removably secured thereto by the nut *d* engaging the threaded portion of said axle post. By grasping the handle bar by the handle *e'*, outside the casing A, and moving it from side to side in the slot, the stirrer is rotated and the flour or meal in the bin, is sifted through the sieve *b'* and caught in a removable pan or other vessel, *c*.

*f'* designates slides which are secured to the handle arm E and move therewith from side to side, said slides extending such a distance on each side of said handle arm that when the latter is moved to one end of the slot they will still cover the other end thereof. These slides are fastened together by bolts *f²* which pass through the slot in the casing and have their ends threaded to receive screw taps, and they serve to keep said slot closed at all times, thereby preventing insects and small vermin from entering said slot and also preventing the flour or meal from escaping through said slot during the sifting process.

Guards $f$ are secured to the casing between the latter and the inner surfaces of the slides. These guards are of prime importance because they prevent the wear on the body of the casing which the latter would otherwise be subjected to by frictional contact therewith of said slides and stiffen and strengthen the same at the point where said slot is located. This is extremely advantageous as the body of the casing is usually made of thin sheet metal for the purpose of lightness and cheapness.

Having thus described my invention, what I claim as new, and desire to secure by Letters Patent, is—

1. The herein described flour bin and sifter, consisting of the casing A, a stationary deflector therein, having a flange at its lower end, a sieve secured to said flange, a stationary cross bar under said sieve, having its ends secured to said casing, said cross bar having a central aperture, a stirrer above said sieve, resting at its ends on said flange of the deflector, and provided with a downwardly projecting axle post extending through said aperture in the cross bar, said axle post having a screw threaded lower extremity and a rectangular portion between said stationary bar and its threaded portion, a handle bar extending through an elongated opening in the casing directly to said axle post and having at its inner end a rectangular aperture engaging the rectangular portion of said axle post, and a nut engaging the threaded portion of said axle post and serving to removably secure said handle bar thereto, all substantially as shown and described.

2. In a combined flour bin and sifter, the combination with the casing having an elongated slot, a sieve within said casing, a stirrer above said sieve, and an operating handle extending from said stirrer through said elongated slot and adapted to work back and forth within the latter, of guards secured to the inner and outer sides of the casing contiguous to said slot and between the casing and slides, said guards serving to stiffen and strengthen the casing and to prevent injury to the latter by the slides, substantially as described.

In testimony whereof I have hereunto set my hand this 11th day of February, 1892.

MILLARD F. BROWN.

Witnesses:
J. F. Cox,
CHAS. D. SHANK.